(12) United States Patent
Yaseen et al.

(10) Patent No.: US 8,255,813 B2
(45) Date of Patent: Aug. 28, 2012

(54) DECLARATIVE TASK-BASED USER INTERFACES

(75) Inventors: Rahim Mohamed Yaseen, Redwood City, CA (US); Jon Rexford Degenhardt, Mountain View, CA (US); Sean Kevin Frogner, San Francisco, CA (US); Sudhakar Kaki, Pleasanton, CA (US); Maria Elisabeth Kaval, Menlo Park, CA (US); Yee Wah Lee, San Mateo, CA (US); Min Lu, Fremont, CA (US); Christopher Scott Nash, San Mateo, CA (US); Kaushik Roy, Foster City, CA (US); Kanchan Shringi, Redwood City, CA (US); Vipul Shroff, Cupertino, CA (US); Yu Sui, San Mateo, CA (US); Alvin H. To, Redwood City, CA (US); Sanjin Tulac, Mountain View, CA (US); Dejia Wang, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/722,775

(22) Filed: Mar. 12, 2010

(65) Prior Publication Data

US 2011/0093781 A1  Apr. 21, 2011

Related U.S. Application Data

(63) Continuation of application No. 11/525,985, filed on Sep. 22, 2006, now Pat. No. 7,681,133.

(60) Provisional application No. 60/727,248, filed on Oct. 14, 2005.

(51) Int. Cl.
G06F 3/00 (2006.01)
G06F 9/44 (2006.01)

(52) U.S. Cl. ........ 715/763; 715/709; 715/765; 715/762; 715/967

(58) Field of Classification Search .................. 715/705, 715/709, 740, 751, 763, 764, 765, 781, 810, 715/835, 846, 961, 965, 966, 967; 705/1; 707/705, 781, 802, 803, 805; 709/204, 217, 709/223; 717/100; 718/1, 100
See application file for complete search history.

(56) References Cited

U.S. PATENT DOCUMENTS

| | | | |
|---|---|---|---|
| 5,524,241 A | 6/1996 | Ghoneimy et al. | 707/10 |
| 5,684,998 A | 11/1997 | Enoki et al. | 713/310 |
| 6,122,640 A | 9/2000 | Pereira | 707/648 |
| 6,353,839 B1 | 3/2002 | King et al. | |
| 6,671,716 B1 | 12/2003 | Diedrichsen et al. | 707/E17.119 |

(Continued)

OTHER PUBLICATIONS

"SQL As Understood by SQLite," http://web.archive.org/web/20050207124742/www.sqlite.org/lang_conflict.html, Feb. 2005, pp. 2.

(Continued)

*Primary Examiner* — Xiomar L Bautista
(74) *Attorney, Agent, or Firm* — Campbell Stephenson LLP

(57) ABSTRACT

A method for building wizard-style user interfaces (UIs) for a business task is disclosed. The method includes receiving metadata at a computer system, where the metadata comprises information regarding the business task, generating an analysis by analyzing the metadata, generating user guidance information, and executing flow and business logic of the business task. The user guidance information is with regard to the business task, and the user guidance information is based on the analysis.

25 Claims, 16 Drawing Sheets

U.S. PATENT DOCUMENTS

| | | |
|---|---|---|
| 6,741,967 B1 | 5/2004 | Wu et al. |
| 6,918,053 B1 | 7/2005 | Thatte et al. ............... 714/16 |
| 7,315,826 B1* | 1/2008 | Guheen et al. ............... 705/7.29 |
| 7,389,361 B2 | 6/2008 | Major et al. |
| 7,548,898 B1 | 6/2009 | Tarenskeen et al. ............... 707/1 |
| 7,640,548 B1 | 12/2009 | Yu et al. |
| 2001/0044738 A1 | 11/2001 | Elkin et al. ............... 705/8 |
| 2001/0044751 A1 | 11/2001 | Pugliese et al. ............... 705/26 |
| 2002/0111949 A1 | 8/2002 | Barga et al. ............... 707/10 |
| 2003/0204503 A1* | 10/2003 | Hammer et al. ............... 707/6 |
| 2004/0015851 A1 | 1/2004 | Newhook et al. ............... 717/116 |
| 2004/0054644 A1 | 3/2004 | Ganesh et al. ............... 707/1 |
| 2004/0181560 A1 | 9/2004 | Romanufa et al. ............ 707/202 |
| 2004/0181775 A1 | 9/2004 | Anonsen et al. ............... 717/104 |
| 2004/0255182 A1 | 12/2004 | Lomet et al. ............... 714/2 |
| 2005/0038687 A1* | 2/2005 | Galdes ............... 705/9 |
| 2005/0149376 A1* | 7/2005 | Guyan et al. ............... 705/9 |
| 2005/0160398 A1* | 7/2005 | Bjornson et al. ............... 717/104 |
| 2005/0187983 A1 | 8/2005 | Narang et al. ............... 707/200 |
| 2005/0193286 A1 | 9/2005 | Thatte et al. ............... 714/48 |
| 2005/0198564 A1 | 9/2005 | Sinzig et al. ............... 715/507 |
| 2005/0262112 A1* | 11/2005 | Moore ............... 707/100 |
| 2006/0074735 A1* | 4/2006 | Shukla et al. ............... 705/8 |
| 2006/0095274 A1* | 5/2006 | Phillips et al. ............... 705/1 |
| 2006/0143034 A1* | 6/2006 | Rothermel et al. ............... 705/1 |
| 2006/0288014 A1 | 12/2006 | Edwards et al. ............... 707/100 |
| 2007/0038963 A1* | 2/2007 | Moore ............... 715/859 |
| 2007/0283352 A1* | 12/2007 | Degenhardt et al. ............ 718/100 |

OTHER PUBLICATIONS

"SQL Server Books Online." http://web.archive.org/web/20040602065934/http://doc.ddart.net/mssql//sql2000/html/, Jun. 2004, pp. 6.

Noyes, "System. Transactions and connection pooling," http://briannoyes.net/2005/09/14/SystemTransactionsAndConnectionPooling.aspex., Sep. 14, 2005, pp. 4.

* cited by examiner

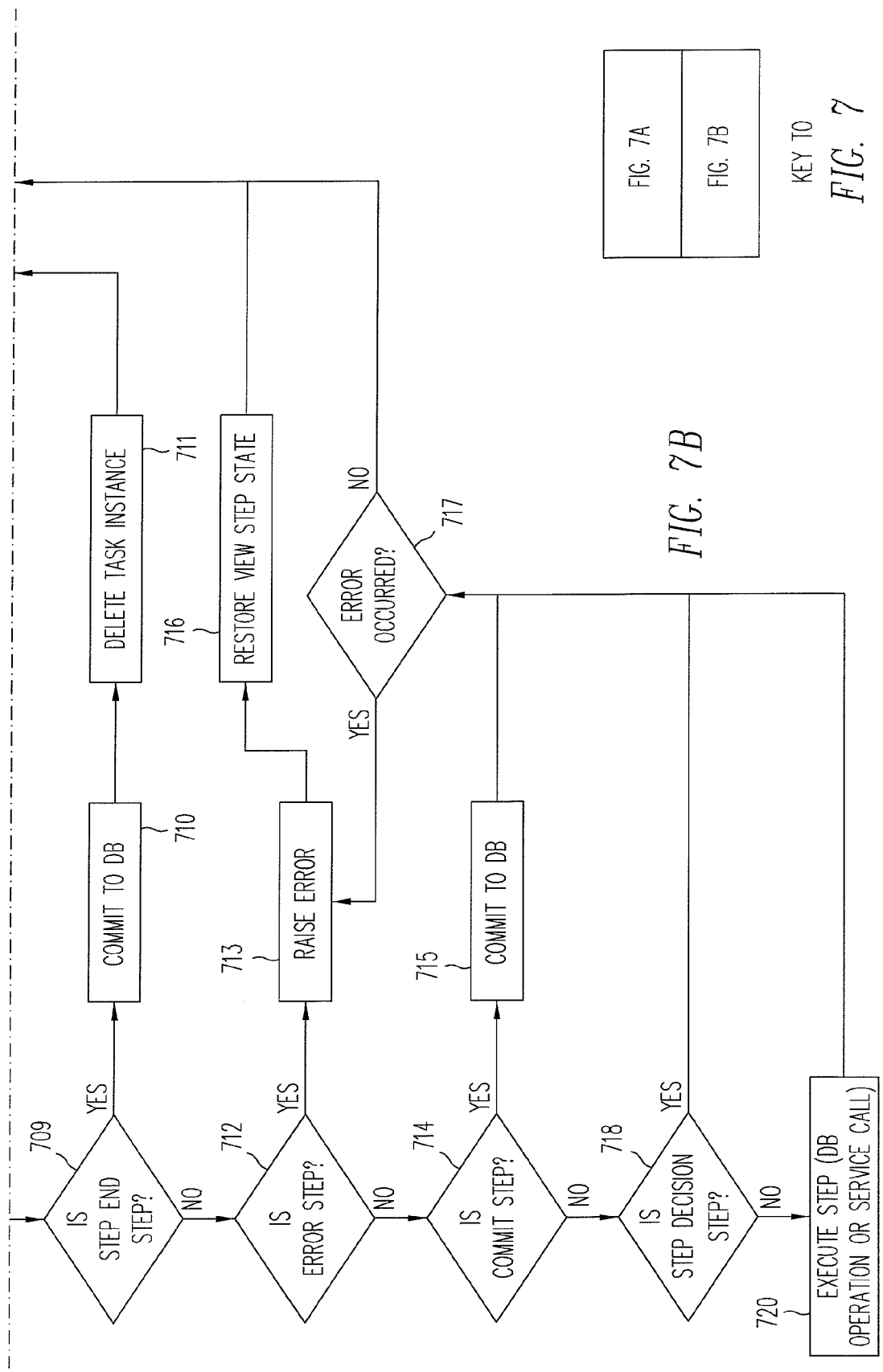

DECLARATIVE TASK-BASED USER INTERFACES

CROSS-REFERENCE TO RELATED APPLICATIONS

This application is a continuation of U.S. patent application Ser. No. 11/525,985, entitled "Declarative Task-Based User Interfaces", filed Sep. 22, 2006 now U.S. Pat. No. 7,681, 133, naming Rahim Mohamed Yaseen, Jon Rexford Degenhardt, Sean Kevin Frogner, Sudhakar Kaki, Maria Elisabeth Kaval, Yee-Wah Lee, Min Lu, Christopher Scott Nash, Kaushik Roy, Kanchan Shringi, Vipul Shroff, Yu Sui, Alvin H. To, Sanjin Tulac, and Dejia Wang as inventors, which claims priority to U.S. Provisional Application No. 60/727, 248, filed Oct. 14, 2005. This application is assigned to Oracle Corporation, the assignee of the present invention. The above-identified applications and their disclosures are incorporated herein by reference for all purposes as if completely and fully set forth herein.

FIELD OF THE INVENTION

Embodiments of the present invention relate generally to business process modeling, and more particularly to providing a declarative tool for creating wizard style user interfaces for a business task.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Oracle Corp., All Rights Reserved.

BACKGROUND OF THE INVENTION

Business applications allow end users to perform business tasks via designated user interfaces (UIs) or views. With some business applications, end users cannot effectively interact with the UI views unless they understand the logic behind each UI view and how the UI views relate to each other. As a result, end users typically have to go through extensive training before they can start working with the designated UI views.

An expense associated with training can be minimized through the use of an additional tool known as a UI wizard. The UI wizard guides end users through different views, using step-by-step dialogs. The development of a UI wizard is usually done using a procedural or object-oriented programming language by experienced software developers that have thorough understanding of the underlying business logic. If the business logic changes, the wizard code needs to be modified, and then shipped to the customers with a new product release.

SUMMARY OF THE INVENTION

The present invention relates to various aspects of building wizard-style user interfaces (UIs) for a business task.

According to one aspect of the present invention, an exemplary method includes identifying a collection of metadata associated with a business task, and processing the collection of metadata to provide a set of wizard-style UIs pertaining to the business task.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1A:
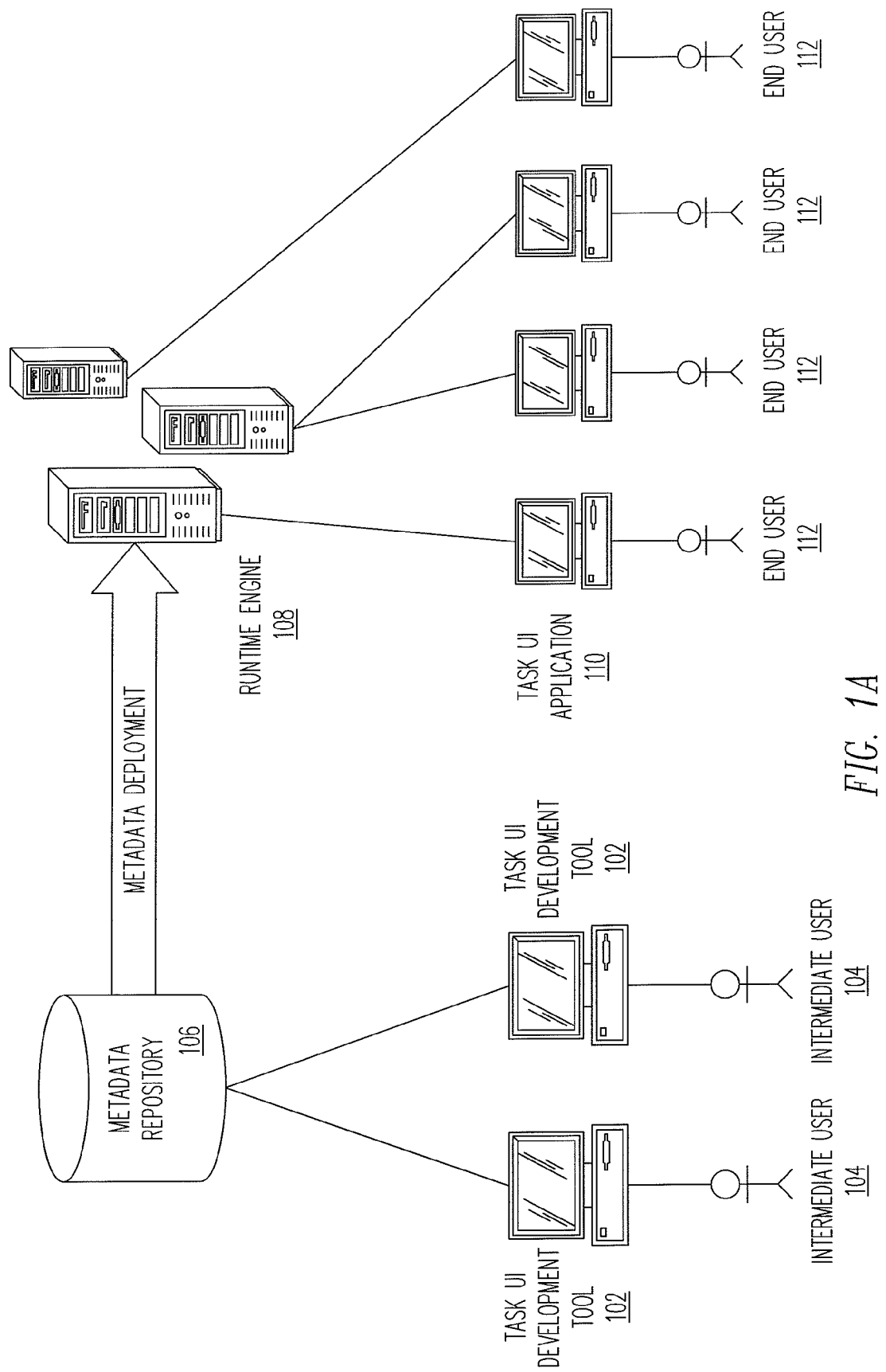
FIG. 1A is a block diagram of one embodiment of a system for building and presenting wizard-style UIs for business tasks.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; and the like.

Embodiments of the present invention relate to various aspects of building wizard-style, guided user interfaces (UIs) for accomplishing business tasks. A business task may support a variety of different processes including, for example, filling out objectives, applying for a loan, conducting a survey, qualifying a lead, approving expense reports, etc. Exemplary problems solved by a task may be as follows:

multiple step transactions that require several independent actions to be completed (or rolled back) as a unit (e.g., balance transfers that credit one account and debit another);

complex multiple step activities (e.g., setting up new user accounts with roles, security and profile information);

multiple step activities dependent on regulatory business logic (e.g., customer authorization steps, acknowledgement of required disclosures, quoting complex products with configuration rules and validation requirements);

data creation activities requiring data quality and duplicate checking (e.g., service requests from gold customers requiring a committed resolution time within 24 hours and scheduling of a call back activity);

decision processes requiring branching logic to determine the appropriate sequence of activities (e.g., presentation of available upgrade or upsell products to a customer based on geography and current products owned by the customer);

guidance or scripting to assist a user during a live interaction when real-time decision making, presentation of supporting information (text and/or graphic) and a consistent message is critical to a successful interaction (e.g., walking a customer through a live portfolio analysis and offer presentation, informing the customer of the sales team that will be handling their inquiry).

The wizard-style task UI is a sequence of task specific UI views that lead an end user to perform process-centric work that may include applying business logic, evaluating conditional fields, external system integration, etc. The result is an improved end-user experience with shorter learning curves and higher task completion rates.

FIG. 1 is a block diagram of one embodiment of a system for building wizard-style UIs for business tasks. The system includes a task UI development tool 102, a metadata repository 106 and a runtime engine 108.

The task UI development tool 102 is a declarative tool that allows intermediate users 104 (e.g., business analysts, software developers, etc.) to design wizard-style UIs for business tasks without writing any code. The tool 102 enables intermediate users 104 to specify steps of a business task and the execution flow for the steps. The steps may include, for example, UI view steps, database operation steps, decision steps, service (external and/or internal) invocation steps, etc. The tool 102 may be a graphical editor that allows an intermediate user 104 to create a visual representation of a task that reflects the task steps and their execution flow. In one embodiment, the visual representation of the task is in the form of a flowchart that includes a sequence of steps to be performed for the business task. In one embodiment, the tool 102 enables a intermediate user 104 to define navigation controls for UI view steps of the task. These navigation controls may include, for example, Next/Previous buttons, Pause button, Cancel button, etc.

In one embodiment, the tool 102 also allows an intermediate user 104 to specify properties for the task. These properties may include task-level properties defining characteristics of the task (e.g., the name of the task, transactional behavior, etc.) and step-level properties defining characteristics of individual steps (e.g., fields to be entered by an end user for a UI view step, database fields to be updated for a database operation step, branching conditions for a decision step, the name of a service to be called for a service invocation step, etc.). An exemplary UI illustrating the operation of one embodiment of the tool 102 will be discussed in more detail below in conjunction with FIG. 1B.

In one embodiment, the tool 102 converts the visual representation of the task and the task properties into a collection of metadata and stores the resulting collection of metadata in the metadata repository 106. In one embodiment, the metadata is represented using an XML document based on an XML schema.

The runtime engine 108 deploys, at runtime, task metadata stored in the metadata repository 106 and processes the task metadata to produce a set of wizard-style UIs. The wizard-style UIs are presented to end users 112 by task UI applications 110. The end users 112 may be connected or disconnected mobile users. In one embodiment, mobile end users launch and run while operating in disconnected mode. When the end user is connected, any data resulting from completed tasks is synchronized back to the server.

In one embodiment, the runtime engine 108 provides navigation support for walking end users 112 through UI sequences. In particular, end users can progress through tasks by entering data in the UI view and pressing the Next button to move to the next view. End users can also navigate backward in the task (Previous button), modifying previously entered data if desired, then navigating forward again via the Next button. In one embodiment, at the last step in the task, an end user 112 can use the Submit button to commit the task data to the main database tables.

In one embodiment, the runtime engine 108 performs business operations and dynamically controls view sequencing as the task progresses. This allows the execution of the flow to be dynamically modified based on data entered by the end user 112 during the task. The runtime engine 108 can support several types of operations, including, for example, database accesses, business service calls, and decision steps. Since these operations are performed automatically by the runtime engine 108, rather than by an explicit user actions such as button presses, the end user 112 no longer needs to know when to press particular buttons or in which order.

In one embodiment, changes to business data made as part of a task are not committed to the main database until the end-user has successfully completed the task. New and modified data is kept separate from the main database data and is visible only while the task is executing and only to the end user running the task. When the end user completes the task, all data is committed to the main database and made visible to other users in the enterprise.

In one embodiment, the runtime engine 108 allows an end user 112 to pause a task (e.g., using the Pause button) and resume it at a later time. In one embodiment, paused tasks are displayed in the user's Inbox. The Inbox may support resuming paused tasks and transferring tasks to other users. Once the task is transferred, it appears in the Inbox of the user it was transferred to.

In one embodiment, the runtime engine 108 allows an end user 112 to cancel the task (e.g., using the Cancel button) being run by reverting all changes made during the current session and restoring the task to its last paused state. In one embodiment, a task can be deleted entirely from the Inbox, discarding all the work done in the task.

In one embodiment, tasks may operate either as standalone entities, or as an integral part of an overarching business process. For example, a Change Contact Address task is a standalone task because it is a self-contained unit of work initiated by the end user. Another exemplary standalone task initiates a business process upon its completion. For example, a Create Expense Report task may initiate a business process for approving the expense report and paying the expenses. Yet another exemplary standalone task may be embedded in the business process as a Task Step. The Task Step may assign a task to an end user by placing an entry in the user's Inbox where the user can launch it. The business process may wait until the end-user runs and completes the task, at which point the business process would be resumed.

Figure 1B:
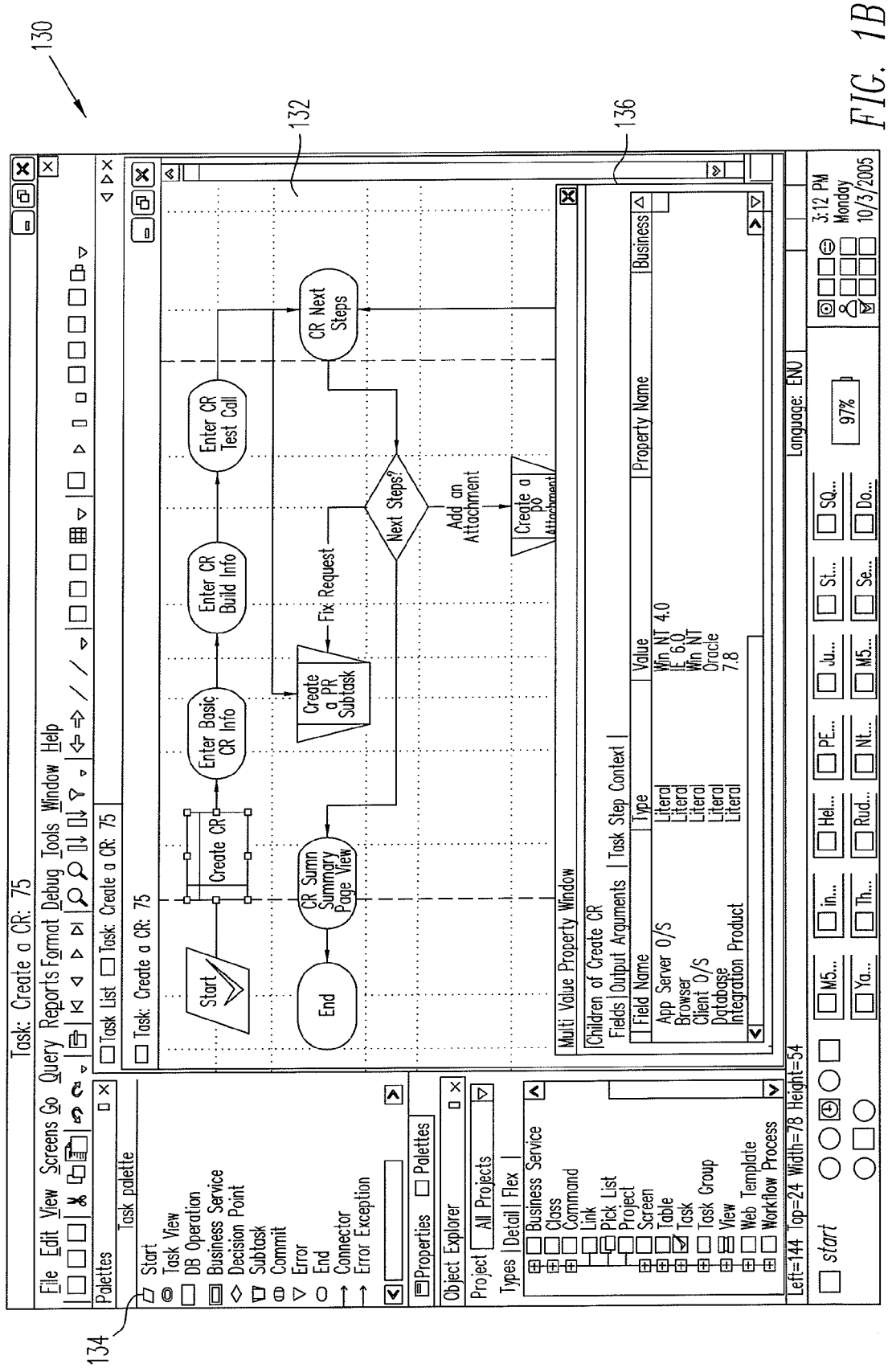
FIG. 1B illustrates an exemplary UI provided by a task UI development tool according to one embodiment of the present invention.

FIG. 1B illustrates an exemplary UI 130 provided by a task UI development tool according to one embodiment of the present invention.

Referring to FIG. 1B, the UI 130 contains several areas including a task palette area 134, a working area 132 and a property window 136. The area 134 displays a list of different shapes representing various types of task steps and connectors for connecting the steps. Various task step types may include, for example, a task UI view, a database operation, a business service invocation, a decision point, a commit step, an error step, a start step, an end step, and a subtask step. A subtask step executes a subtask, i.e., a portion of a task that was factored out for reuse in other tasks.

An intermediate user can select shapes for desired task steps, drag them to the working area 132, and connect them as needed in the working area 132, creating a flowchart. The property window 136 allows the intermediate user to specify properties for the task and individual steps.

Figure 1C:
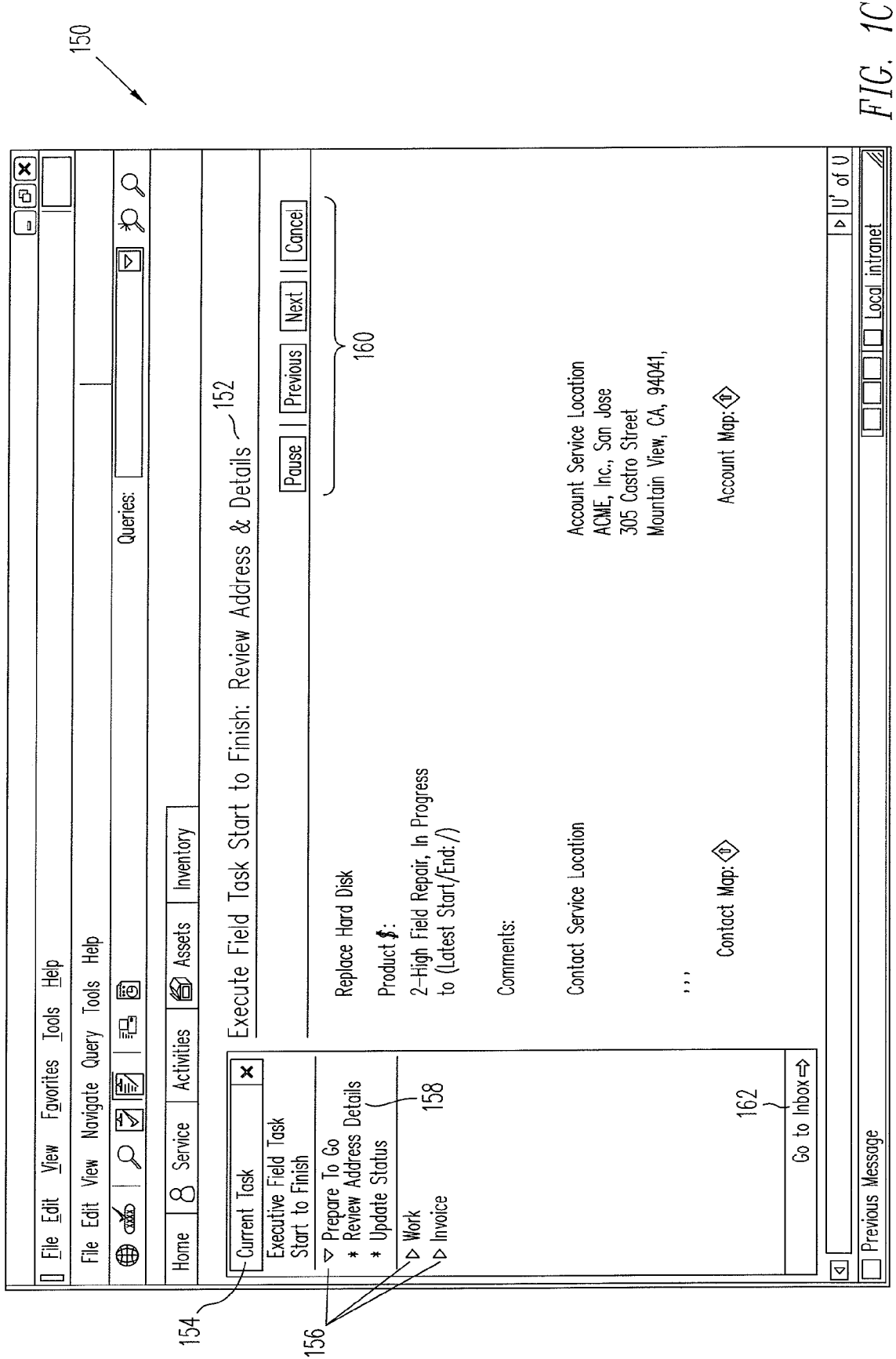
FIG. 1C illustrates an exemplary UI from a wizard-style sequence of task UIs, according to one embodiment of the present invention.

FIG. 1C illustrates an exemplary UI 150 from a wizard-style sequence of task UIs, according to one embodiment of the present invention.

Referring to FIG. 1C, the UI 150 contains a main area 152 that presents the task view called "Review Address & Details." The task view includes one or more applets consisting of UI controls showing the specific presentation for the current step in the task. At the top of the task view is a set of navigational controls 160 that include the Pause, Previous, Next, and Cancel buttons.

A current task area 154 displays the current state of the task, including the task name, chapters 156 in the task, and the names of view steps in the current chapter, including the view step 158 that is being presented in the main area 152. Chapters 156 provide visible division of tasks into groups of steps. In one embodiment, using chapters frees screen space by hiding view steps visited outside of the current chapter. In one embodiment, end users can expand and collapse chapters to see and hide visited view steps, respectively.

Figure 2:
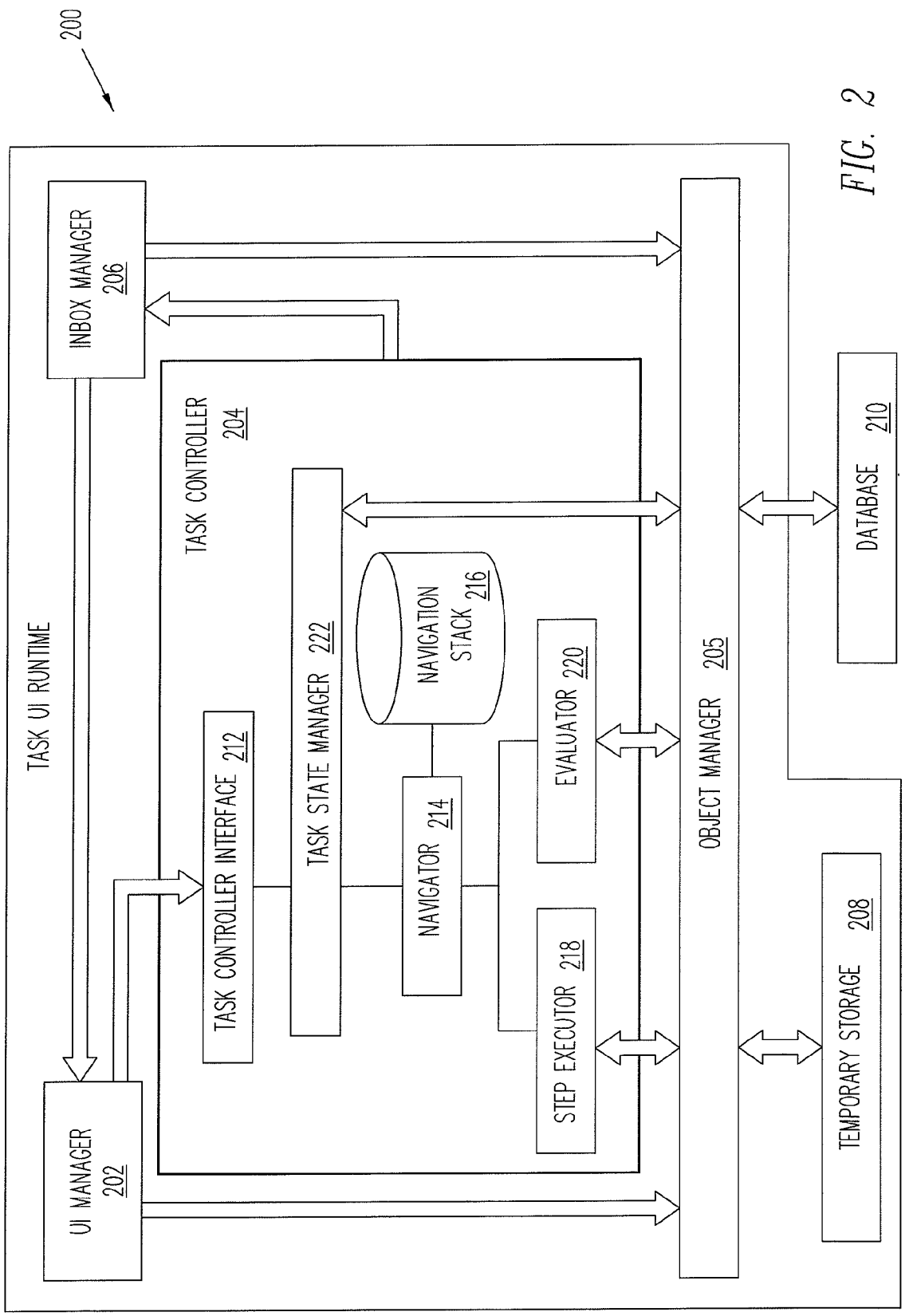
FIG. 2 is a block diagram of one embodiment of a runtime engine.

FIG. 2 is a block diagram of one embodiment of a runtime engine 200. The runtime engine 200 includes a UI manager 202, an Inbox manager 206, a task controller 204, an object manager 205, a temporary storage 208 and a main database 210.

The UI manager 202 is responsible for rendering and presenting wizard-style task UIs to end users, and communicating the end user input to the object manager 205 and task controller 204.

The Inbox manager 206 is responsible for controlling new and paused tasks stored in users' Inboxes.

The task controller 204 is responsible for analyzing the metadata pertaining to the task and the end user input, and executing flow and business logic based on this analysis to guide the end user through the business task.

The temporary storage 208 stores data associated with the task throughout the lifetime of the task. In one embodiment, this data is only visible while the task is executing and only to the end user running the task. In another embodiment, the temporary storage 208 may be shared across multiple tasks and their end users. Once an end user successfully completes the task, the data stored in the temporary storage 208 for this task is committed to the database 210 and becomes visible to other users in the organization.

In one embodiment, the task controller 204 includes a task controller interface 212, a navigator 214, a navigation stack 216, a step executor 218, an evaluator 220 and a task state manager 222.

In one embodiment, the task controller interface 212 interacts with the UI manager 202, and invokes appropriate internal components of the task controller 204. In one embodiment, the task controller interface 212 includes one or more APIs to communicate with different entities.

The orchestrator 224 calls the step executor 218 to execute the step activity, and pushes the step instance into the navigation stack 216.

The navigator 214 is responsible for performing forward and backward navigation. In one embodiment, when at the decision point, the navigator 214 calls the evaluator 220 to evaluate branch condition criteria and determine the forward path. On forward navigation for all other step types, the navigator 214 may call the step executor 218 to execute the activity represented by the step, and push the stack frame into the navigation stack 216. Each stack frame may contain a reference to the current business object state. The business object is a collection of data associated with particular UI, including data currently entered by the end user. The navigator 214 restores business object states from the navigation stack 216 for the task views during backward navigation.

The task state manager 222 is responsible for maintaining the life cycle of task instances and their states. In addition to navigation stack, task state encompasses the values of all task variables for the current task instance. In one embodiment, the task state manager 222 maintains the life cycle of a task by enforcing its state transition rules as discussed in more detail below in conjunction with FIG. 12.

In one embodiment, the runtime engine 200 also includes an object manager 205 that provides data management for the task controller 204, Inbox manager 206 and the UI manager 202. In one embodiment, the object manager supports transaction isolation for operations performed within the boundary of a task in a manner transparent to its client components. The object manager stores updates associated with these operations in the temporary storage 208 until the task controller 204 calls the object manager to commit the data to the database 210. The task controller 204 may also call the object manager to set data savepoints and rollback the task data to a savepoint when necessary. In one embodiment, the object manager captures the task business object (BO) state, and provides the functionality to store and retrieve BO state from its serialized image and database 210.

An exemplary task execution scenario will now be discussed in more detail with reference to the major components of the runtime engine 200, according to one embodiment of the present invention. The scenario may begin when an end user selects a new or paused task in the Inbox. In response, the Inbox manager 206 calls the UI manager 202, passing the name of the task. The UI manager 202 extracts the task context, and calls the task controller 204 to start a task. Then, the task controller 204 calls the object manager 205 to create the temporary storage 208 for the task. Using the object manager 205, the task controller 204 reads data from the temporary storage 208 and writes data back to the temporary storage 208.

If the next step is a task view step, the task controller 204 exits and returns control to the UI manager 202, passing the name of the next task view. The UI manager 202 renders the task view and stores the user data through the object manager 205 in the temporary storage 208. If the end user activates a navigation control (e.g., by pressing the Next, Previous or Cancel button) in a task UI view, the UI manager 202 calls the task controller 204 passing a navigation operand (e.g., Next, Previous or Cancel). The task controller 204 performs all relevant non-UI related task activities and returns control back to the UI manager 202, providing the name of the subsequent task UI view.

If the user pauses the task, the task controller 204 saves the current task state via the object manager 205 to the database 210, bypassing the temporary storage 208. The UI data remains in the temporary storage. If the user finishes the task, the task controller 204 issues a commit to the object manager 205, which saves the UI data permanently from temporary storage 208 to database 210. Depending on whether the task is paused or completed, the task controller 204 may update or remove the task from the Inbox.

Figure 3:
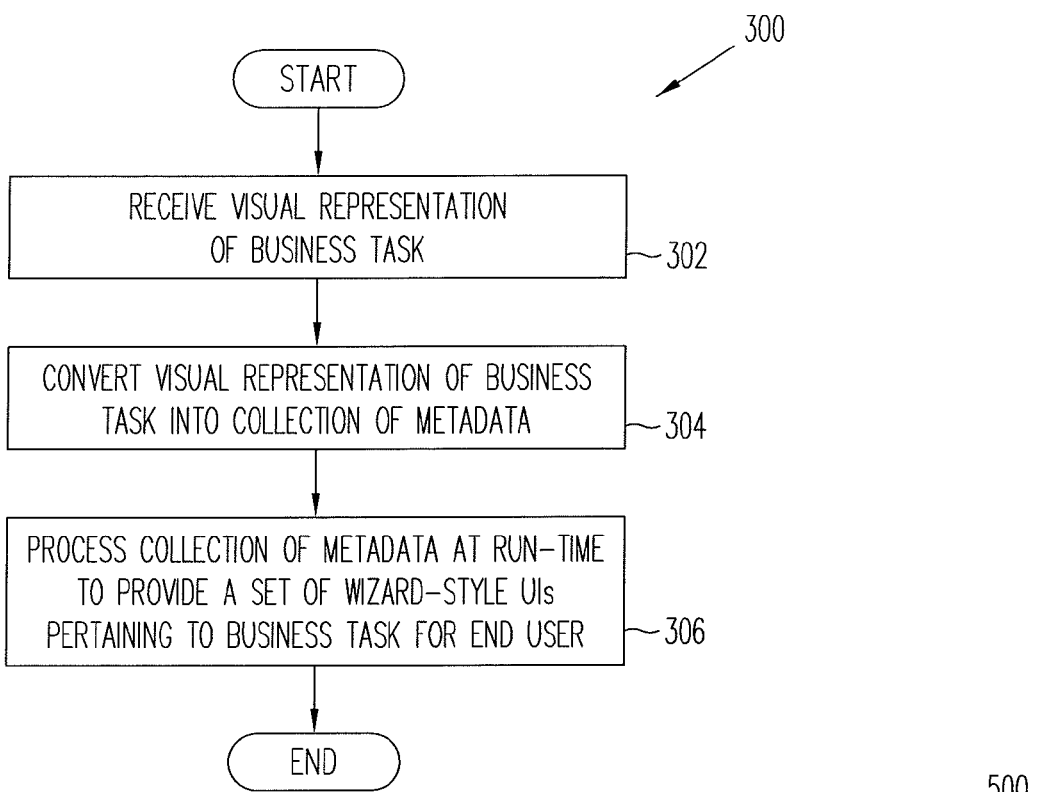
FIG. 3 is a flow diagram of one embodiment of a method for building wizard-style UIs pertaining to a business task.

FIG. 3 is a flow diagram of one embodiment of a method 300 for building wizard-style UIs pertaining to a business task. The method may be performed by processing logic that may comprise hardware (e.g., circuitry, dedicated logic, etc.), software (such as run on a general purpose computer system or a dedicated machine), or a combination of both. Processing logic may reside in the system 100 of FIG. 1A.

Referring to FIG. 3, method 300 begins with processing logic receiving a visual representation of a business task (block 302). The visual representation of the business task is created by an intermediate user in a design environment (e.g., a business analyst, or a software developer). In one embodiment, the design environment allows the intermediate user to create the task visual representation declaratively, without writing any code. In one embodiment, the task visual representation is in the form of a flowchart containing a sequence of steps to be performed for the task. These steps may include, for example, UI view steps, service invocation steps, database operation steps, decision steps, etc.

In one embodiment, the design environment allows the intermediate user to provide properties for the task (e.g., the name of the task, transactional behavior, etc.) and individual steps of the task (e.g., fields to be entered by an end user for a UI view step, database fields to be updated for a database operation step, branching conditions for a decision step, the name of a service to be called for a service invocation step, etc.). In one embodiment, one of the step-level properties for non-UI steps is the repeatable property that specifies whether the step should be re-executed upon re-visit during forward navigation. In one embodiment, the design environment also allows the intermediate user to define labels for navigation controls for the task UI views (e.g., Previous, Next, Pause, Cancel, etc.). In addition, the design environment may allow the intermediate user to specify metrics (e.g., task performance parameters during runtime, timestamps, etc.) within a task flow that can be used for various task analyses.

At block 304, processing logic converts the visual representation of the task into a collection of metadata (e.g., XML representation of metadata). This metadata defines the steps, the execution flow, the branching logic, UI-related instructions, and other information pertaining to the task. The collection of metadata may also include properties of the task and properties of individual steps of the task.

At runtime, processing logic processes the collection of metadata pertaining to the task to provide a set of task wizard-style UIs for an end user (block 306). In one embodiment, processing logic also provides navigation support to allow the end user to use the navigation controls when navigating through the task UIs, as will be discussed in more detail below. In one embodiment, processing logic captures analytics data during the execution of the task.

Figure 4:
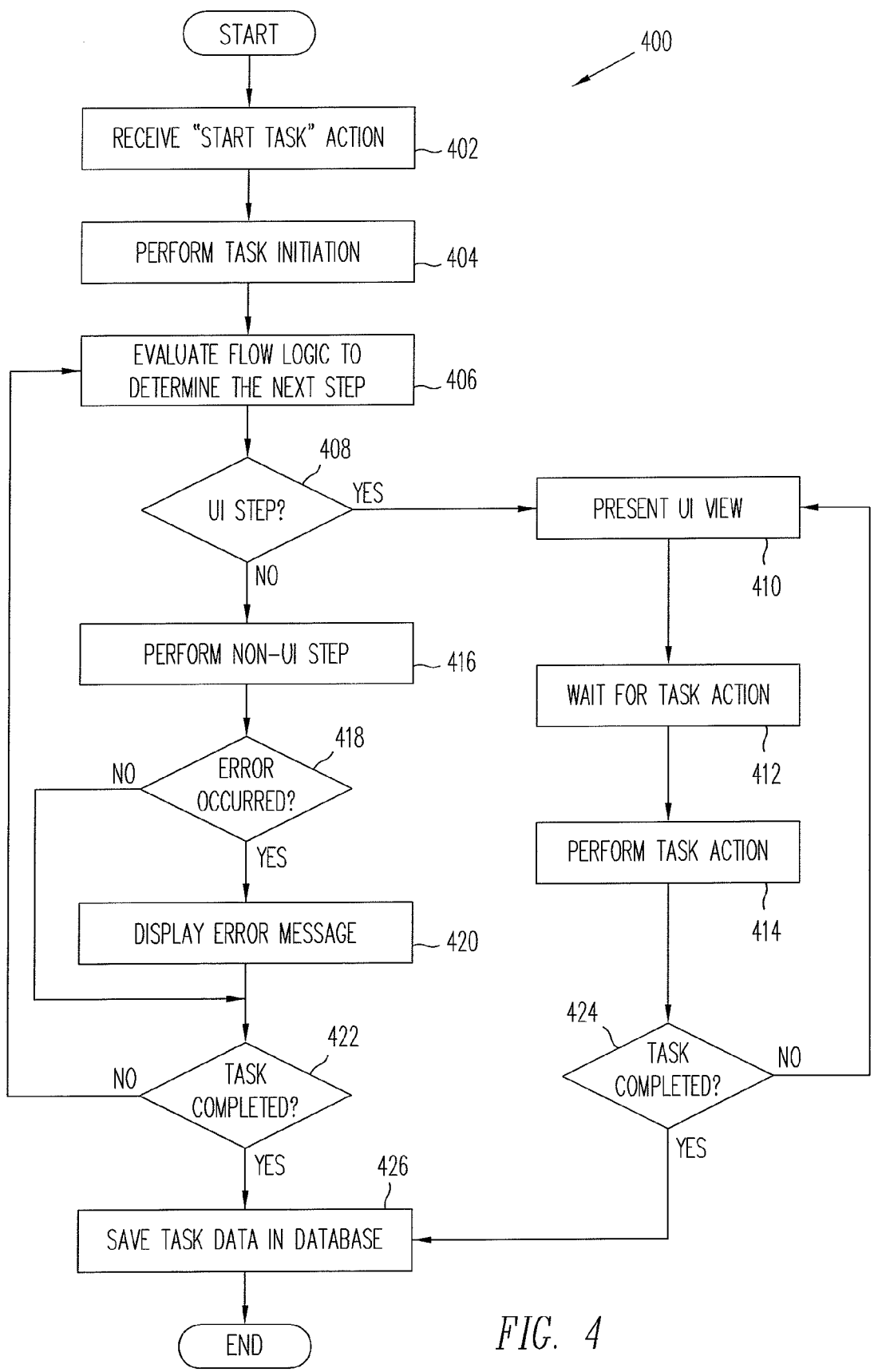
FIG. 4 is a flow diagram of one embodiment of a method for executing a business task associated with wizard-style UIs.

FIG. 4 is a flow diagram of one embodiment of a method 400 for executing a business task associated with wizard-style UIs. The method may be performed by processing logic that may comprise hardware (e.g., circuitry, dedicated logic, etc.), software (such as run on a general purpose computer system or a dedicated machine), or a combination of both. Processing logic may reside in the runtime engine 200 of FIG. 2.

Referring to FIG. 4, method 400 begins with processing logic receiving the Start Task action (block 402). The Start Task action may be received when an end user selects a new or paused task (e.g., stored in the Inbox). Alternatively, the Start Task action may be run when an end-user starts a new instance of a standalone task.

At block 404, processing logic initiates the task selected by the end user and determines the next UI view. In one embodiment, as part of task initiation, processing logic loads the definition of the task into a task definition cache maintained by the runtime engine 200. The definition of the task contains the collection of metadata discussed above. One embodiment of a task initiation process will be discussed in more detail below in conjunction with FIG. 5.

At block 406, processing logic evaluates, based on the task definition, the flow logic of the task to identify the next step to be performed. This may involve evaluation of all branching conditions if the current step is a decision step.

At block 408, processing logic decides whether the next step is the UI view determined previously (e.g., during task initiation). If not, processing logic performs the non-UI step (block 416) and checks for errors (block 418). If an error occurred, processing logic presents an error message (block 420) and proceeds to block 422. If no error occurred, processing logic proceeds directly to block 422.

At block 422, processing logic determines if the current step is the last step of the task. If not, processing logic returns to block 406. If so, processing logic saves the task data in the database (block 426).

If processing logic decides at block 408 that the next step is the UI step, processing logic presents the UI view to the end user (block 410) and waits for a navigation action (e.g., Next, Previous, Pause or Cancel). Upon receiving a navigation action (e.g., when an end user presses a navigation button) (block 412), processing logic performs the corresponding task navigation operations (block 414), which may include determining the next UI view, and proceeds to block 424, where processing logic checks whether the task has been completed. If the task has been completed, data in task transaction is saved into the database (block 426), otherwise, the next UI view is presented (block 410), and the loop continues until the task is completed.

The navigation operations may allow the end-user to move to prior UI views (e.g., by activating the Previous button) and then retrace the steps (e.g., by activating the Next button). In one embodiment, the end user can optionally modify data entered and change execution basis. In one embodiment, the steps performed in the execution flow can be conditionally re-executed (e.g., if allowed by the settings provided by the intermediate user) when reached multiple times via the previous/next actions. In one embodiment, the UI view state is maintained across the end-user's previous/next actions. The UI view may be reconstituted in the state where it was left.

In one embodiment, processing logic allows for partial record editing. In particular, a record can be in an incomplete/invalid state when the Previous action is used. Then, partially entered data will be displayed to the end user when the view is returned to via a subsequent Next action. In one embodiment, a user can go iteratively through a sequence of views, and processing logic will maintain the history of step instances through each loop.

In one embodiment, processing logic supports alternate paths when re-executing steps. That is, if an end user uses the Previous button to go backward, he or she may change previously entered data values. Then, when the end user uses the Next button to move forward, the data entry changes can cause a different sequence of task steps to be followed. If so, processing logic follows this different sequence of steps.

In one embodiment, processing logic ensures that partially edited records, which have not been validated only show up in the execution branch and UI view that originally created them. If the task is completed, processing logic ensures that records that have not been validated do not get committed to the database.

One embodiment of the navigation process will be discussed in more detail below in conjunction with FIG. 6.

Figure 5:
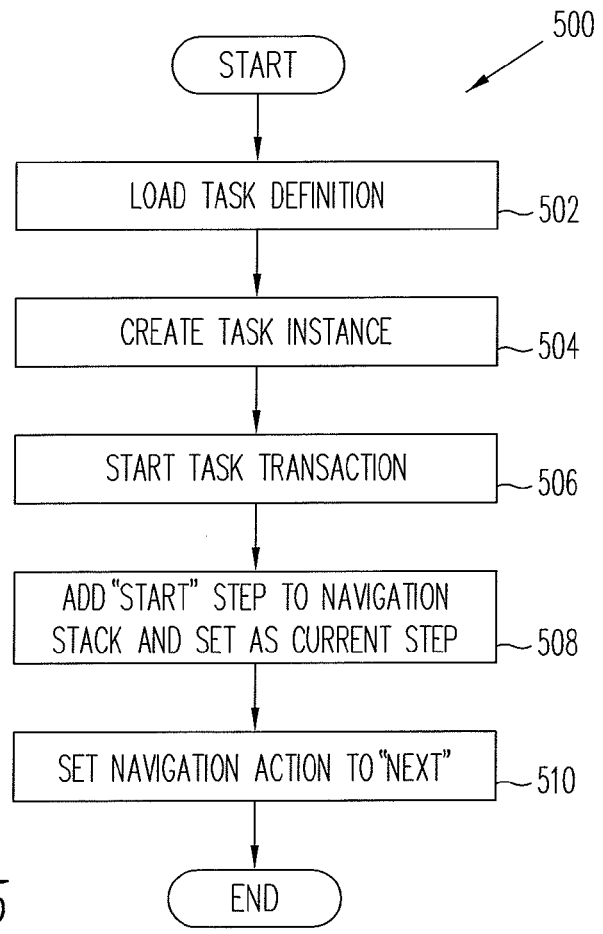
FIG. 5 is a flow diagram of one embodiment of a task initiation process.

FIG. 5 is a flow diagram of one embodiment of a task initiation method 500. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 5, method 500 begins with processing logic loading a definition of the task (block 502). In one embodiment, processing logic loads the task definition containing a relevant collection of metadata into a task definition cache.

At block 504, processing logic creates a task instance.

At block 506, processing logic starts the task transaction. In one embodiment, processing logic invokes the object manager to start the task transaction.

At block 508, processing logic adds the Start step instance to the navigation stack and sets the current step to the Start step.

At block 510, processing logic sets the navigation action to Next.

Figure 6:
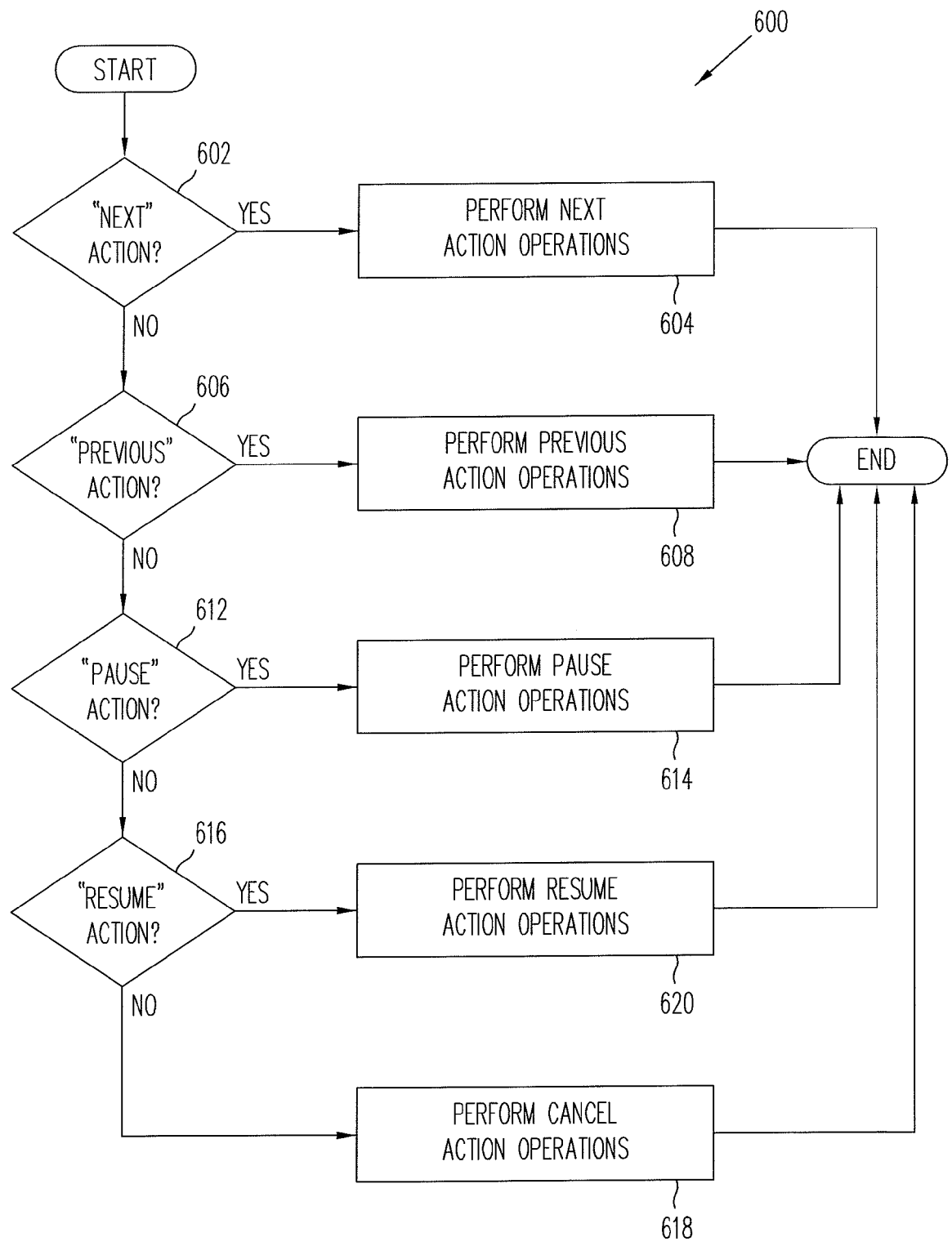
FIG. 6 is a flow diagram of one embodiment of a navigation method.

FIG. 6 is a flow diagram of one embodiment of a navigation method 600. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 6, method 600 begins with processing logic determining whether the current navigation action is the Next action (block 602). If so, processing logic performs the Next action operations (block 604). One embodiment of a process for performing the Next action operations will be discussed in more detail below in conjunction with FIG. 7.

If the current navigation action is the Previous action (block 606), processing logic performs the Previous action operations (block 608). One embodiment of a process for performing the Previous action operations will be discussed in more detail below in conjunction with FIG. 8.

If the current navigation action is the Pause action (block 612), processing logic performs the Pause action operations (block 614). One embodiment of a process for performing the Pause action operations will be discussed in more detail below in conjunction with FIG. 9.

If the current navigation action is the Resume action (block 616), processing logic performs the Resume action operations (block 620). One embodiment of a process for performing the Resume action operations will be discussed in more detail below in conjunction with FIG. 10.

If the current navigation action is none of the above, then processing logic decides that it is the Cancel action and performs the Cancel action operations (block 618). One embodiment of a process for performing the Cancel action operations will be discussed in more detail below in conjunction with FIG. 11.

The navigation operations utilize a history stack referred to as the Navigation stack. In particular, when a task step is first completed, the step instance information is stored in a frame of the Navigation stack. If the current task step is a view step, a snapshot of the current UI state is recorded in a frame of the Navigation stack. The task controller uses the Navigation stack to navigate between previously completed steps, and to restore UI states for the task views during backward navigation.

Figure 7A:
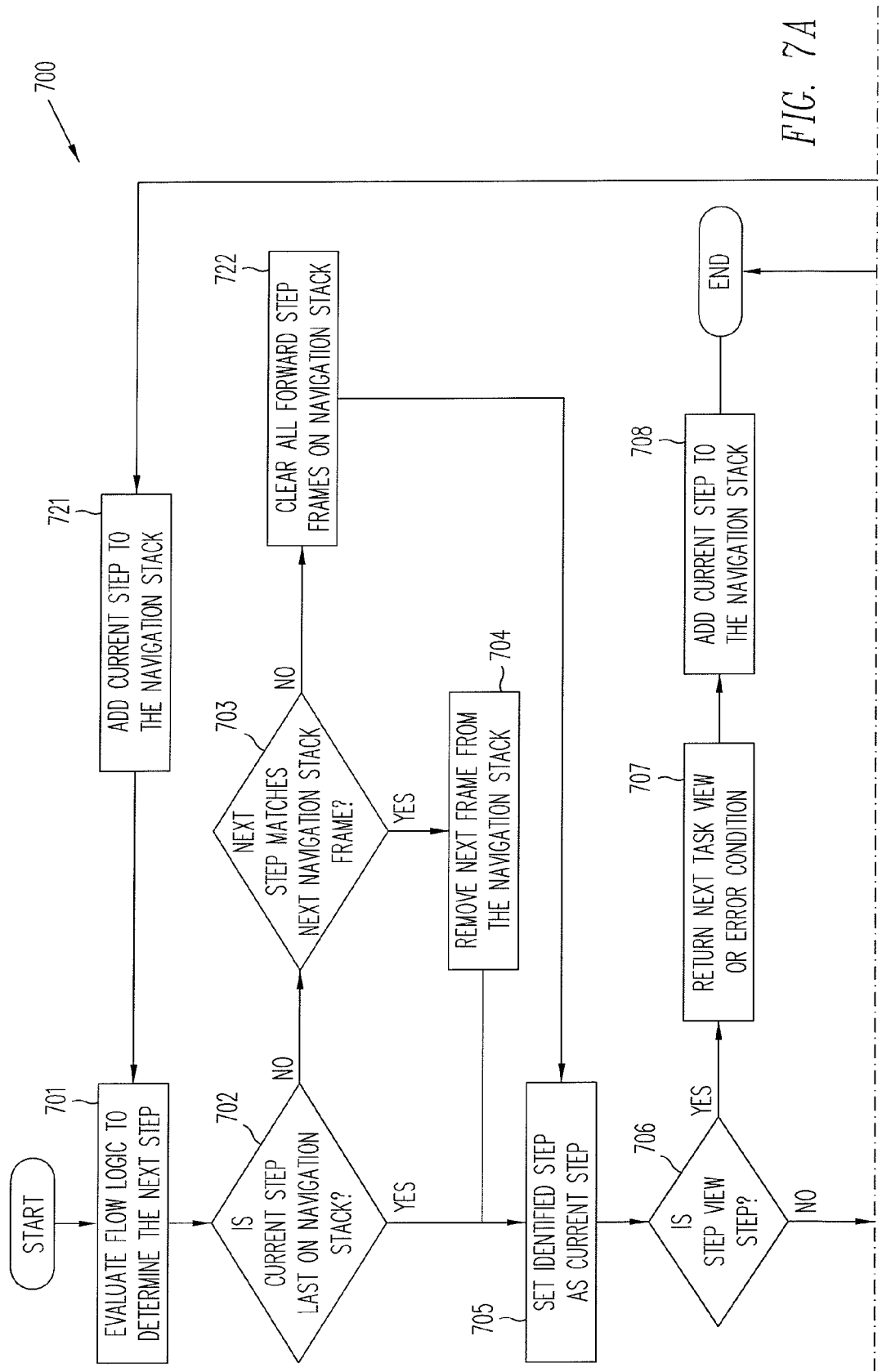
FIG. 7 is a flow diagram of one embodiment of a method for performing Next action operations.

FIG. 7 is a flow diagram of one embodiment of a method 700 for performing Next action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 7, method 700 begins when a signal for a next action is received. Processing logic starts with evaluating the flow logic to determine the next step (block 701). This may include evaluation of all branching conditions if the current step is a decision step. This functionality is similar to that performed by block 406 in FIG. 4.

Once the next step has been identified, processing logic checks the navigation stack to see if the current step is the last step on the navigation stack (block 702). If false, the processing logic checks if the identified step is the same as the next step on the navigation stack (block 703). If this is also false, it means that the task execution sequence has been altered. As a result, the forward step history on the navigation step becomes invalid, and needs to be erased (block 722). Processing logic continues by setting the identified step as the current step (block 705). If the identified step is a task view step (block 706), processing logic returns it as the next task view (block 707), and adds the identified step to the navigation stack (block 708).

If the identified step is an end step (block 709), processing logic commits task data from temporary storage to the database (block 710) and deletes the current task instance (block 711).

If the identified step is an error step (block 712), processing logic raises the user-defined error (block 713), and restores the state to the last shown view (block 716).

If the identified step is a commit step (block 714), processing logic commits task data from temporary storage to the database (block 715). If successful, the commit step is added to the navigation stack (block 721).

If the identified step is a decision step (block 718), processing logic proceeds to add the decision step to the navigation stack (block 721). The branching logic is then evaluated in block 701.

If the type of the identified step is none of the above, it is either a database operation step or a service invocation step. In either case, processing logic executes the identified step (block 720) and, if successful, the executed step is added to the navigation stack (block 721). After that, processing logic returns to block 701, at which point the above sequence is repeated until the view or end step is reached.

Figure 8:
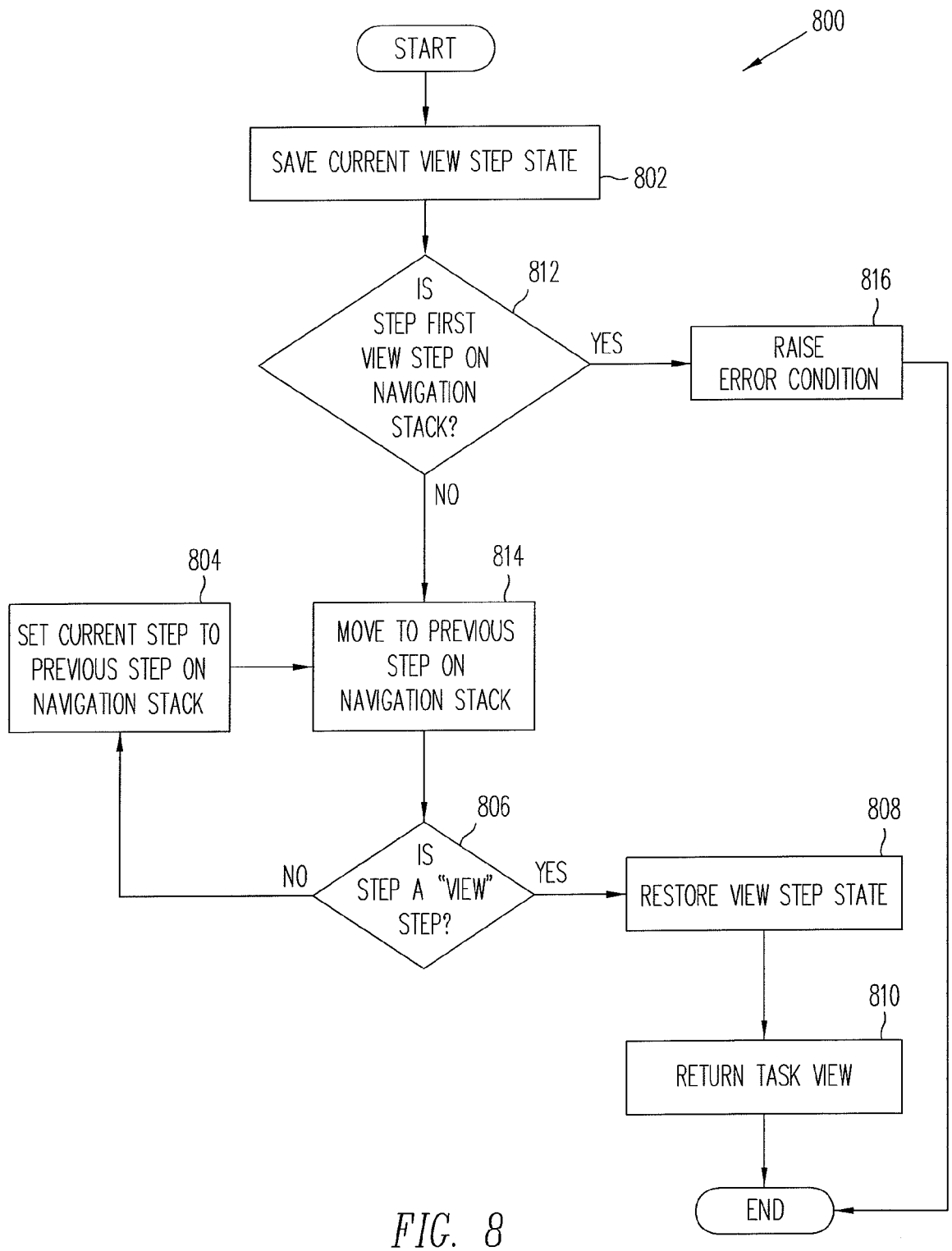
FIG. 8 is a flow diagram of one embodiment of a method for performing Previous action operations.

FIG. 8 is a flow diagram of one embodiment of a method 800 for performing Previous action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 8, method 800 begins with processing logic saving the state of the current view step on the Navigation stack (block 802).

Next, processing logic sets the current step to the previous step from the Navigation step (block 804) and determines whether this task step is a view step (block 806). If so, processing logic restores the state of this view step (block 808) and returns this task view (block 810). If no, processing logic determines whether this view step is the first step on the navigation stack (block 812).

If this view step is the first view step on the navigation stack, processing logic returns an error (block 816). Otherwise, processing logic moves to the previous view step on the Navigation stack (block 814), restores its state (block 808), and returns its name as the name of the view to be presented to the end user (block 810).

Figure 9:
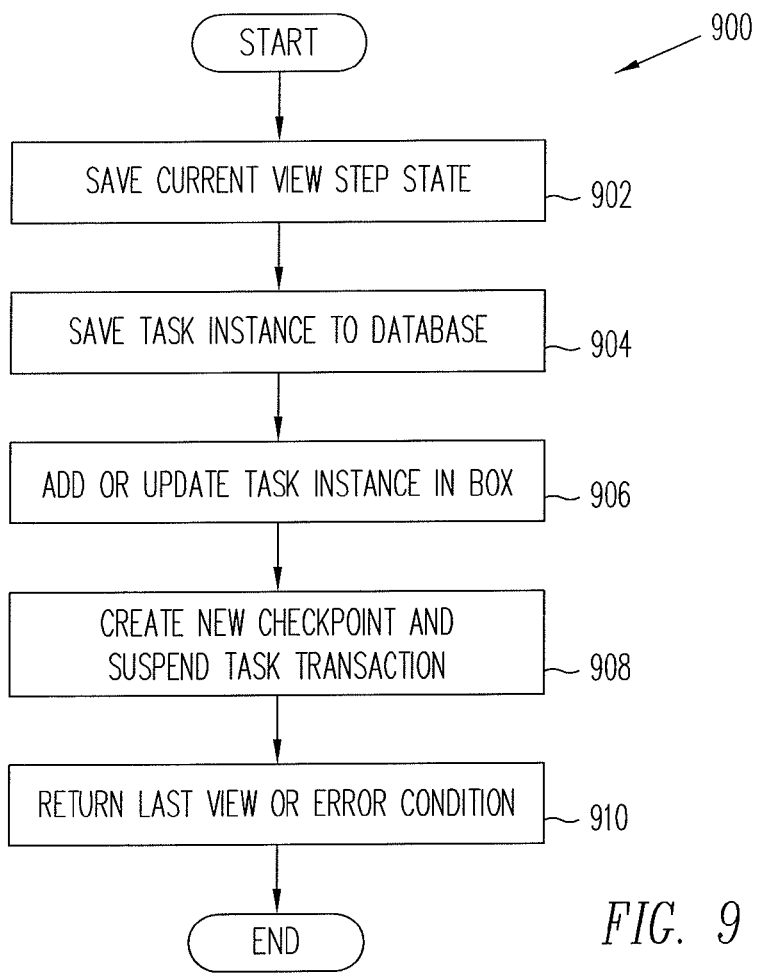
FIG. 9 is a flow diagram of one embodiment of a method for performing Pause action operations.

FIG. 9 is a flow diagram of one embodiment of a method 900 for performing Pause action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 9, method 900 begins with processing logic saving the state of the current view step on the Navigation stack (block 902).

At block 904, processing logic saves the task instance to the database.

At block 906, processing logic adds or updates the task instance in the Inbox in a paused state.

At block 908, processing logic creates a new checkpoint and suspends the task transaction (task UI data in temporary storage).

At block 910, processing logic returns the last task view presented to the user before the task had started.

Figure 10:
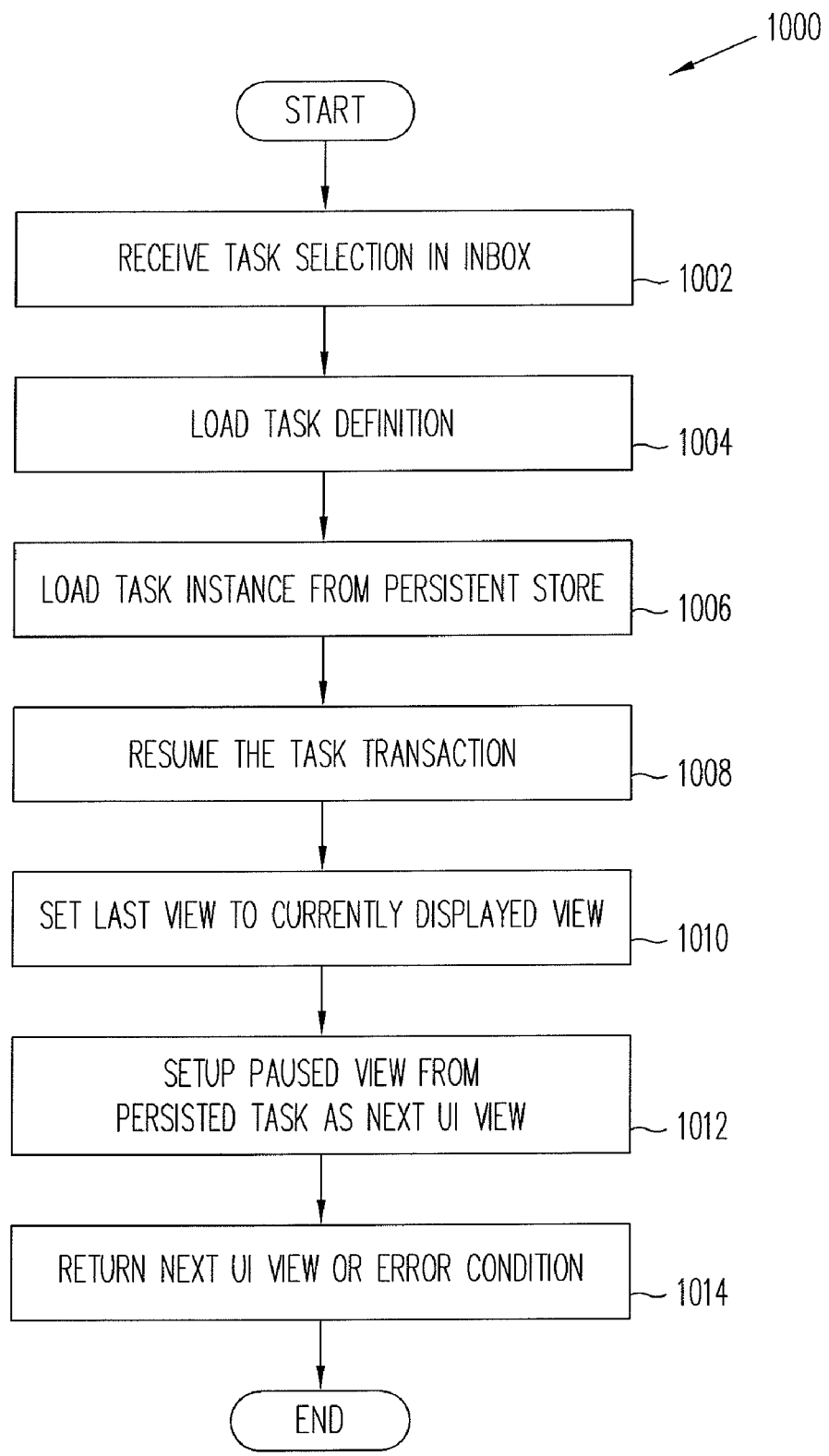
FIG. 10 is a flow diagram of one embodiment of a method for resuming a paused task.

FIG. 10 is a flow diagram of one embodiment of a method 1000 for resuming a paused task. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 10, method 1000 begins with processing logic identifying a paused task selected by the end user in the Inbox (block 1002).

At block 1004, processing logic loads the definition of the paused task. In one embodiment, task definitions may be cached in memory, to minimize latency.

At block 1006, processing logic loads the task instance (including its state) from the database.

At block 1008, processing logic resumes the task transaction.

At block 1010, processing logic stores the name of the currently displayed view. This view may be shown upon task completion, or when the task is next paused, or canceled.

At block 1012, processing logic reads the name of the view at which the task was last paused from the restored task state.

At block 1014, processing logic returns the next task view, or an error in case it had been encountered during any of the steps in this process.

Figure 11:
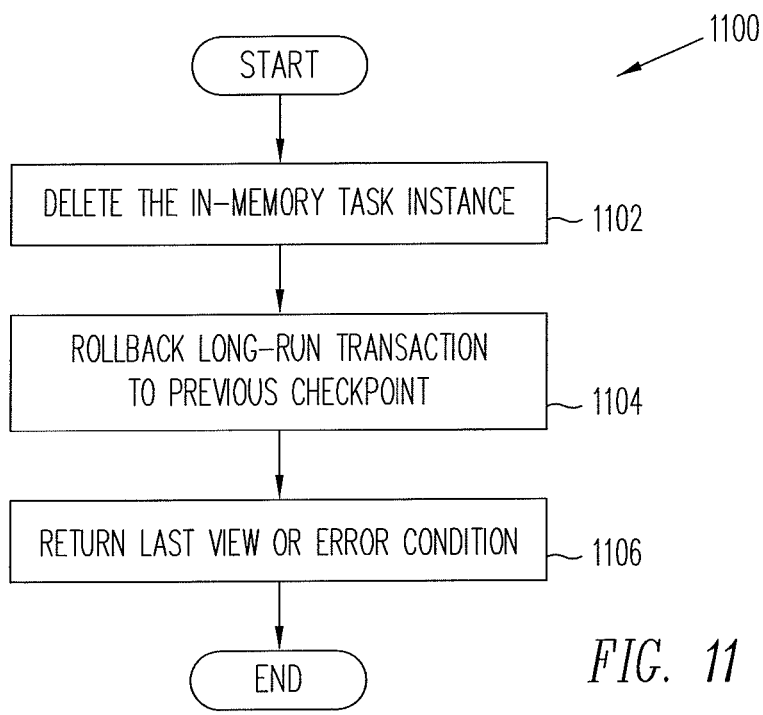
FIG. 11 is a flow diagram of one embodiment of a method for performing Cancel action operations.

FIG. 11 is a flow diagram of one embodiment of a method 1100 for performing the Cancel action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 11, method 1100 begins with processing logic deleting the task instance from memory (block 1102).

At block 1104, processing logic rolls back the task transaction to the previous checkpoint (created during pause).

At block 1106, processing logic returns the last view, or an error if it had been encountered during the operation of this method.

Figure 12:
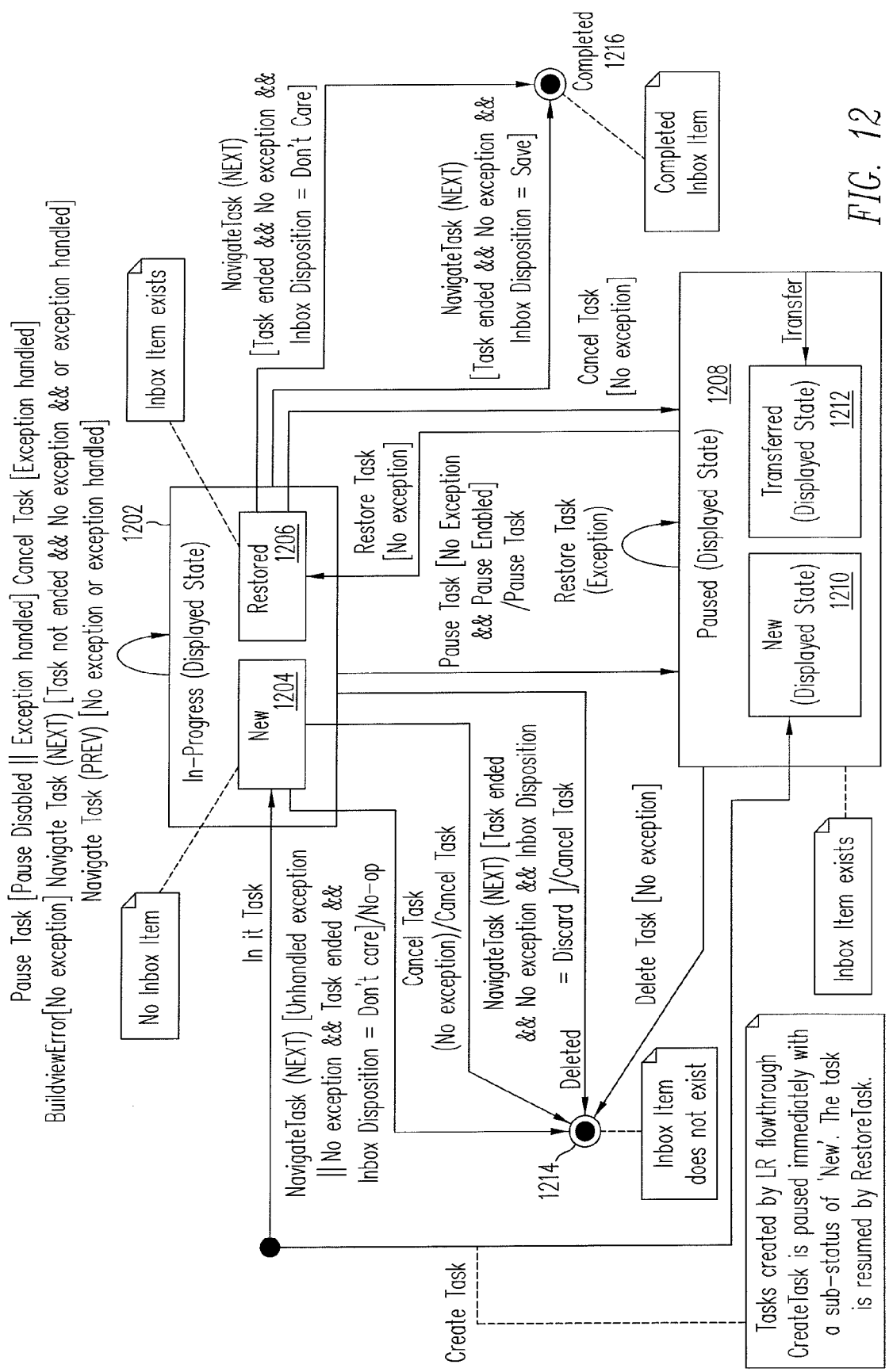
FIG. 12 is a block diagram illustrating how a task instance transitions between internal states during run-time execution.

FIG. 12 is a block diagram illustrating how a task instance transitions between internal states during run-time execution.

Referring to FIG. 12, a task can enter in-progress state 1202 if it is a new task 1204 or a restored task 1206. The in-progress state 1202 indicates that the owner is working on the task. The new task 1204 may enter the in-progress state upon task initialization. The restored task 1206 may enter the in-progress state from paused state 1208 upon task resumption.

Tasks can change their state from in-progress 1202 to deleted 1214 as a result of an unhandled exception during navigation, when deleted from the Inbox, or upon a cancel task event (latter transition may only be applicable to new tasks). Deleted state 1214 indicates that the user has deleted the task. When a task is deleted, the task state is removed from the system.

Tasks can change their state from in-progress 1202 to completed 1216 when the task successfully ended during navigation, with or without reflecting the completed state in the Inbox. Completed status indicates that the task has successfully run to completion. When a task is completed, the task state is removed from the system. The task controller assigns a task with Completed status when the owner clicks the Submit button and the task has successfully arrived at the End step without any error. If an error has occurred before the End step, the task will continue to be in In-Progress status. In one embodiment, a task-level property called inbox disposition may control whether completed tasks are transitioned to completed 1216, or directly to deleted 1214 state. This gives the flexibility to save history for tasks that require it, while avoiding inbox clutter for tasks that do not require explicit trace.

Tasks can change their state from in-progress 1202 to paused 1208 when the owner has paused the task explicitly or implicitly. Tasks are explicitly paused by the owner clicking on the Pause button. Tasks are implicitly paused when the owner has navigated out of the task view. New tasks 1210 can also directly enter the paused state 1208 if they were created by a business process through the create task event.

Transferred state 1212 is a sub-status of the paused state 1208. Tasks in transferred state 1212 have the same runtime behavior as any other tasks in paused state, except for a different status label in inbox UI, which indicates to the end user that the task has been reassigned to him or her.

Figure 13A:
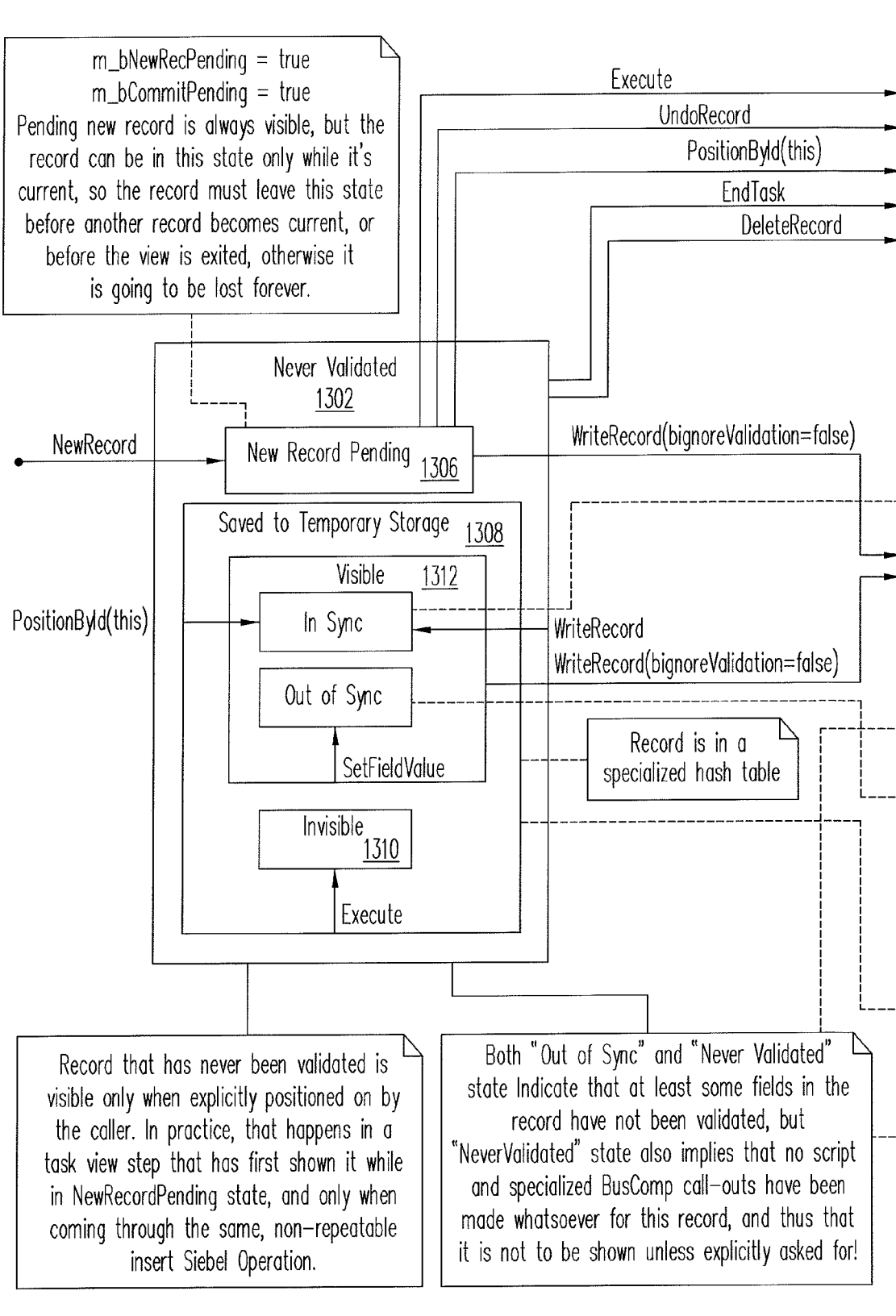
FIG. 13 is a block diagram illustrating how data objects change state during run-time execution.
Figure 13B:
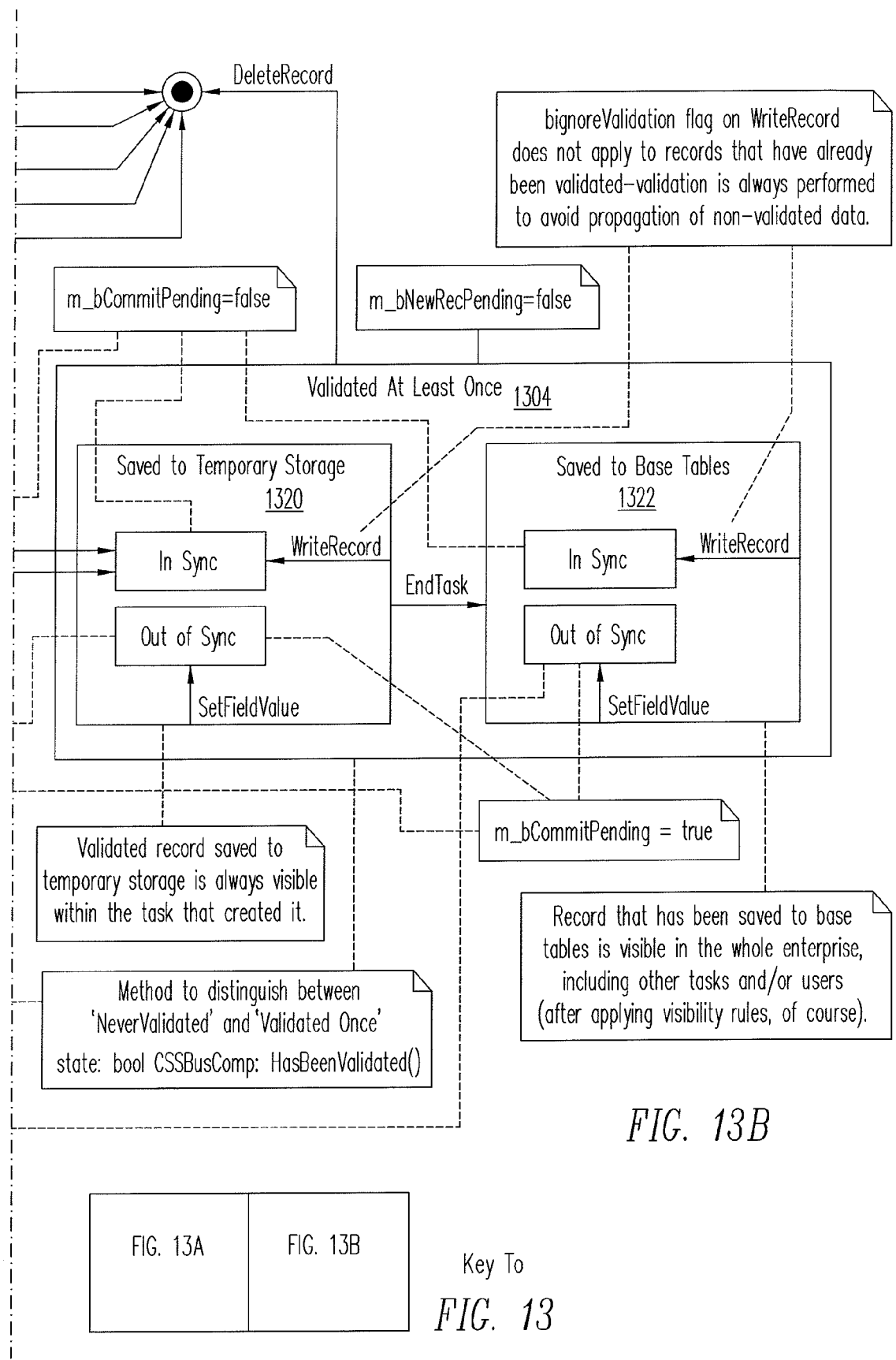

FIG. 13 is a block diagram illustrating how data objects change state during run-time execution.

Referring to FIG. 13, a record may have never been validated 1302 or validated at least once 1304. A never validated record may be a new record 1306, or a record saved to a temporary storage 1308. This kind of record may be invisible 1310 in all cases, except if it is explicitly positioned on by the caller, when it becomes a visible record 1312. It will be appreciated that this mechanism is used to show partially entered records only in the branch and UI view that created them.

Records validated at least once 1304 include records 1320 saved only to the temporary storage. These records are only visible within the task that created them. In addition, validated at least once records 1304 include records 1322 saved to the base tables (in the database). These records are visible to the whole organization.

Figure 14:
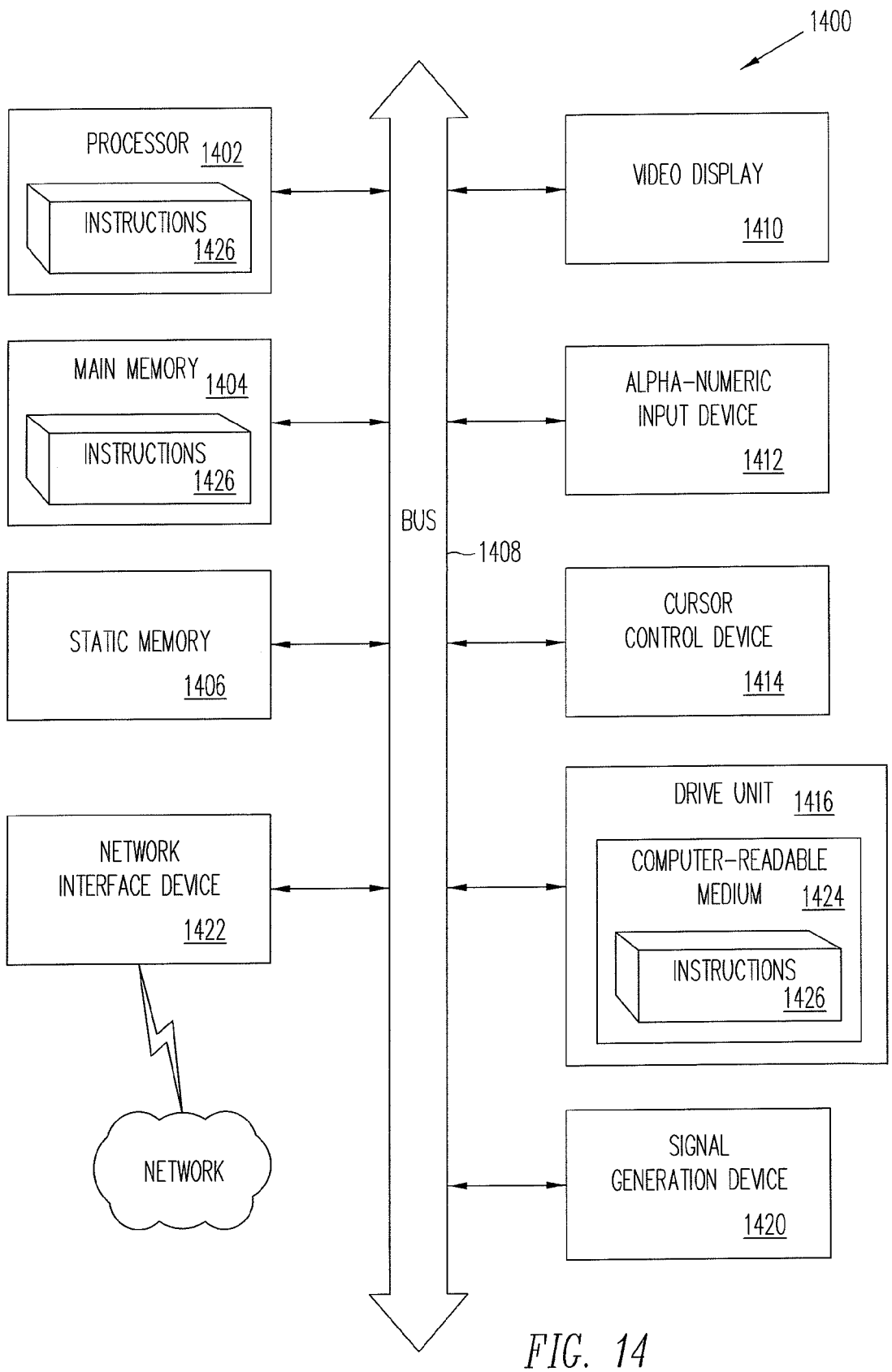
FIG. 14 is a block diagram of an exemplary computer system that may be used to perform one or more of the operations described herein.

FIG. 14 is a block diagram of an exemplary computer system 1400 (e.g., a computer system hosting task controller 204 and/or UI manager 202 of FIG. 2 and/or task UI development tool 102 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1400 includes a processor 1402, a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alpha-numeric input device 1412 (e.g., a keyboard), a cursor control device 1414 (e.g., a mouse), a disk drive unit 1416, a signal generation device 1420 (e.g., a speaker) and a network interface device 1422.

The disk drive unit 1416 includes a computer-readable medium 1424 on which is stored a set of instructions (i.e., software) 1426 embodying any one, or all, of the methodologies described above. The software 1426 is also shown to reside, completely or at least partially, within the main memory 1404 and/or within the processor 1402. The software 1426 may further be transmitted or received via the network interface device 1422. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
 a processor;
 a computer-readable storage medium, coupled to the processor; and
 a runtime engine, wherein
  the runtime engine is coupled to the processor and the computer-readable storage medium,
  the runtime engine is configured to receive metadata,
  the metadata comprises
   information regarding a business task,
  the runtime engine comprises
   a task controller, and
   a navigator,
  the task controller is configured to
   generate an analysis by analyzing the metadata, and
   generate user guidance information regarding the business task based on the analysis,
  the task controller generates the user guidance information, at least in part, by executing flow and business logic of the business task,
  the task controller is configured to perform the executing by virtue of the task controller comprising the navigator, and
a task state manager, coupled to the navigator,
the navigator is configured to facilitate navigation of the flow and business logic of the business task, and
the task state manager is configured to maintain life cycle information regarding the business task.

2. The computer system of claim 1, wherein the runtime engine further comprises:
an object manager, wherein
the object manager and the task controller are coupled to one another.

3. The computer system of claim 2, wherein
the object manager is configured to
receive user input, and
provide data management by virtue of being configured to provide transaction isolation for operations performed within a boundary of the business task,
the transaction isolation isolates a transaction of the business task, and
the transaction is isolated by the transaction isolation in a manner transparent to the task controller.

4. The computer system of claim 3, wherein
the user input comprises at least one business task property and at least one business task step.

5. The computer system of claim 3, wherein the user input further comprises at least one of
a navigation control label, or
a metric.

6. The computer system of claim 5, wherein
the metric comprises at least one of
a task performance parameter, and
a timestamp.

7. The computer system of claim 2, wherein the task controller further comprises:
temporary storage, wherein
the object manager is communicatively coupled to the temporary storage, and
the temporary storage is configured to store data associated with the task throughout the life cycle of the task.

8. The computer system of claim 2, further comprising:
a database, wherein
the database is stored in the computer-readable storage medium, and
the object manager is configured to access the database.

9. The computer system of claim 1, wherein the task controller further comprises:
a navigation stack, wherein
the navigator is coupled to the navigation stack, and
the navigator is further configured to push a stack frame onto the navigation stack.

10. The computer system of claim 9, wherein the stack frame comprises:
a reference to a current business object state of a business object, wherein the business object comprises information represents the business task.

11. The computer system of claim 10, the business object further comprises:
a collection of data associated with a user interface, wherein
the collection of data comprises
data currently entered by a user.

12. The computer system of claim 10, further comprising:
a database, wherein
the database is stored in the computer-readable storage medium,
the object manager is configured to access the database,
the task controller further comprises
temporary storage, wherein
the object manager is communicatively coupled to the temporary storage, and
the temporary storage is configured to store data associated with the task throughout the life cycle of the task.

13. The computer system of claim 12, wherein
the task controller is configured to commit the current business object state from temporary storage to the database.

14. The computer system of claim 12, wherein
the task controller is configured to bypass the temporary storage by committing the current business object state to the database.

15. The computer system of claim 14, wherein
the task controller is further configured to perform the bypass while maintaining another business object state of the business object in the temporary storage.

16. The computer system of claim 1, wherein the task controller further comprises:
a step executor, wherein
the step executor is coupled to the navigator, and
the step executor is configured to execute an activity represented by a task step in the flow and business logic of the business task.

17. The computer system of claim 16, wherein the task step is at least one of
a task UI view,
a database operation,
a business service invocation,
a decision point,
a commit step,
an error step,
a start step,
an end step, or
a subtask step.

18. The computer system of claim 17, wherein
execution of the subtask step executes a subtask, and
the subtask is a portion of a task factored out for reuse.

19. The computer system of claim 1, wherein the task controller further comprises:
an evaluator, wherein
the evaluator coupled to the navigator, and
the evaluator is configured to
evaluate branch condition criteria, and
determine a forward path through the flow and business logic of the business task.

20. The computer system of claim 1, wherein
the life cycle information comprises information regarding
a task instance of the business task, and
a state of the task instance.

21. The computer system of claim 20, wherein
the task state manager is configured to maintain the life cycle information by virtue of being configured to enforce at least one state transition rule.

22. The computer system of claim 1, wherein the metadata further comprises:
user input, wherein
the user input comprises at least one business task property and at least one business task step.

23. The computer system of claim 22, wherein the user input further comprises at least one of
a navigation control label, or
a metric.

24. The computer system of claim 1, further comprising:
a metadata repository, wherein
- the runtime engine is coupled to the metadata repository,
- the metadata repository is configured to store a collection of metadata,
- the collection of metadata comprises the metadata,
- the collection of metadata representing the visual representation of the task and the task properties that are associated with a business task.

25. The computer system of claim 1, further comprising:
a user interface manager, wherein
- the task controller is coupled to the user interface manager, and
- the user interface manager is configured to render wizard-style task user interface elements in a user interface.

* * * * *